(12) United States Patent
Poulin et al.

(10) Patent No.: US 7,871,700 B2
(45) Date of Patent: Jan. 18, 2011

(54) COMPOSITE FIBERS AND ASYMMETRICAL FIBERS BASED ON CARBON NANOTUBES AND COLLOIDAL PARTICLES

(75) Inventors: Philippe Poulin, Talence (FR); Thibaud Vaugien, L'Union (FR)

(73) Assignee: Centre National de la Recherche Scientifique - CNRS (FR)

( * ) Notice: Subject to any disclaimer, the term of this patent is extended or adjusted under 35 U.S.C. 154(b) by 593 days.

(21) Appl. No.: 11/666,118

(22) PCT Filed: Oct. 26, 2005

(86) PCT No.: PCT/FR2005/002679

§ 371 (c)(1),
(2), (4) Date: Aug. 14, 2007

(87) PCT Pub. No.: WO2006/048531

PCT Pub. Date: May 11, 2006

(65) Prior Publication Data

US 2008/0118753 A1 May 22, 2008

(30) Foreign Application Priority Data

Oct. 29, 2004 (FR) .................................. 04 11605

(51) Int. Cl.
*D02G 3/00* (2006.01)
*C11D 3/00* (2006.01)
*B29C 65/00* (2006.01)

(52) U.S. Cl. ...................... 428/372; 428/364; 428/370; 8/115.51; 156/296

(58) Field of Classification Search ................ 428/375; 264/129, 340, 172.15, 178, 180, 181; 156/296; 427/230

See application file for complete search history.

(56) References Cited

U.S. PATENT DOCUMENTS

2002/0008956 A1 * 1/2002 Niu ............................ 361/502

(Continued)

FOREIGN PATENT DOCUMENTS

FR  2 805 179 A1  8/2001

(Continued)

OTHER PUBLICATIONS

T. Seeger et al., "SiOx-coating of carbon nanotubes at room temperature," Chemical Physics Letters, North-Holland Publishing Company, Amsterdam, NL, vol. 339, No. 102, May 4, 2001, pp. 41-46.
Laeticia Petit et al., "Sub-micrometer silica spheres dissymmetrically decorated with gold nanoclusters," Materials Letters, North Holland Publishing Company, Amsterdam, NL, vol. 51, No. 6, Dec. 2001, pp. 478-484.

*Primary Examiner*—D. Lawrence Tarazano
*Assistant Examiner*—Altrev C Sykes
(74) *Attorney, Agent, or Firm*—DLA Piper LLP (US)

(57) ABSTRACT

A method of manufacturing composite fibers comprising two distinct layers having different compositions and physico-chemical properties and controlled, homogenous thicknesses, wherein one of two layers comprises carbon nanotubes and the composite fibers are obtained from carbon nanotube fibers and a first solution of a selected concentration of colloidal particles intended to constitute the second layer, comprising the following steps: placing the fibers in contact, by lateral surfaces thereof, with a surface of a second solution which is adapted to chemically cause aggregation of the colloidal particles and is completely or partially immersed in the second solution, the immersed thickness of the fibers defining the immersion area, placing the thus pre-coated fibers in contract, on the same lateral surface, with a surface of the first colloidal particle solution and immersed in it at most up to the immersion area to locally form a colloidal gel with a fixed thickness determined by the concentration of the first solution, separating the fibers covered in the first solution, and drying and/or evaporating the solvent of the first solution.

14 Claims, 3 Drawing Sheets

U.S. PATENT DOCUMENTS

| | | | |
|---|---|---|---|
| 2002/0048632 A1* | 4/2002 | Smalley et al. | 427/230 |
| 2002/0092613 A1* | 7/2002 | Kuper | 156/296 |
| 2003/0077515 A1* | 4/2003 | Chen et al. | 429/231.8 |
| 2003/0102585 A1* | 6/2003 | Poulin et al. | 264/11 |
| 2005/0126913 A1* | 6/2005 | Burke et al. | 204/547 |

FOREIGN PATENT DOCUMENTS

| | | |
|---|---|---|
| FR | 2 828 500 A1 | 2/2003 |
| FR | 2 846 572 A1 | 5/2004 |
| WO | WO 01/63028 A1 | 8/2001 |

* cited by examiner

COMPOSITE FIBERS AND ASYMMETRICAL FIBERS BASED ON CARBON NANOTUBES AND COLLOIDAL PARTICLES

RELATED APPLICATION

This is a §371 of International Application No. PCT/FR2005/002679, with an international filing date of Oct. 26, 2005 (WO 2006/048531 A1, published May 11, 2006), which is based on French Patent Application No. 04/11605, filed Oct. 29, 2004.

TECHNICAL FIELD

This disclosure relates to a method of manufacturing composite fibers comprising two distinct layers having different compositions and physico-chemical properties as well as controlled, homogenous thicknesses.

The disclosure also relates to the fibers resulting from the method and their applications.

BACKGROUND

The IUPAC standard defines colloidal particles, in general terms, as being particles with a size comprised between 1 nanometer and several micrometers. We refer to this definition whenever it uses the term "colloidal particles".

Natural or synthetic fibers used as textiles or compounded extenders are often coated with additives. This coating has the aim of modifying the surface properties of the fiber or granting it a specific functionality. In certain cases, the term "bonding" can be used. For example, so-called "textile" bonding applied to filaments output from a spinneret consists of depositing a bonding agent ensuring the cohesion of the filaments with each other, reducing abrasion and facilitating subsequent manipulations (weaving) and preventing the build-up of electrostatic charges. There are other cases wherein a fiber must be covered with a specific compound. For example, it is possible to dye a fiber simply by coating it with dyeing agents. An initially insulating textile fiber can be made conductive by coating it with conductive polymers. It is possible to perfume a garment of clothing by coating its fibers with capsules containing a perfume.

Conventional fiber coating results in uniform, symmetric coating of its surface.

However, it is preferable in certain cases to add an additive to a fiber in a different manner, for example, on the surface, but in an asymmetric manner. These different conditions are proposed to improve the properties of the fibers, allowing them to be used for new functions.

Carbon nanotubes have a structure and electronic and mechanical properties which make them very promising materials for many applications: composites, electromechanical actuators, cables, resisting wire, chemical detectors, hydrogen storage, electron-emitting displays, energy converters, electronic components, electrodes, batteries, catalysis media, etc.

Carbon nanotubes can be made into ribbons or fibers by a spinning method described in FR 2 805 179 and WO 01/63028. That method consists of homogeneously dispersing the nanotubes in a liquid environment.

Once dispersed, the nanotubes are re-condensed in the form of a ribbon or a pre-fiber by injecting the dispersion into another liquid causing the nanotubes to coagulate.

The ribbons, pre-fibers or final fibers can be treated by stretching in a wet method to improve the direction of the nanotubes. These reshaping methods are described in FR 01 10611 as dynamically or statically stretching the fiber in solvents with a higher or lower affinity for the coagulating polymer, for improving the structure and the physical properties of the fibers.

The properties of these fibers, as those of any other fibers, depend in a critical manner on the nature and arrangement of their components.

Carbon nanotubes constitute an "intelligent" material capable of responding at a mechanical and electrical level to electrical, mechanical, chemical or biological stimuli. Nanotube fiber can constitute a structure particularly adapted for highlighting these functions. Indeed, the nanotube fiber constitutes a macroscopic object containing a large proportion of oriented nanotubes. Thus, it is possible to produce actuators with performance greatly surpassing that of other nanotube assemblies, such as nanotube paper. It is also possible to manufacture micro-electrodes which are much more sensitive than conventional micro-electrodes made from conventional carbon fibers.

Sensors or actuators based on "intelligent materials" are often used in devices to amplify their deformation. The most common example is the bimetallic strip made from piezoelectric material. These bimetallic strips consist of an active piezoelectric layer and a passive inert layer. When the piezoelectric strip stretches or contracts, the bimetallic strip curves sharply. A very slight deformation, on a microscopic scale, can thus be greatly amplified and viewed macroscopically. In the same way, there are sensors made out of very thin metallic sheets. The strip curves sharply in the presence of a particular chemical component adsorbing on one of its surfaces. This effect is the result of modifying different surface constraints on both surfaces of the thin sheet. As in the example of the piezoelectric bimetallic strip, the mechanical effect is greatly amplified by the asymmetry of the system. This significant amplification of the curvature comes from a slight stretching or contracting deformation.

Such bimetallic strips, functioning as sensors or actuators, can be made from nanotube films. However, the electromechanical and electrochemical properties of fibers being superior to those of films, the use of these fibers improves the intrinsic properties of the whole, which benefits from the orientation and density of the nanotubes in a fiber. Furthermore, this makes it possible to manufacture very small devices which can potentially be used as micro-sensors or micro-actuators.

The production of these bimetallic strips corresponds to an asymmetric structure of the nanotube fiber.

Some approaches have been tried to cover a carbon nanotube fiber in an asymmetric manner.

The fiber can be passed in front of a device which "paints" a single side, over the surface of a liquid in the form of a bath or a drop. This approach can, in certain cases, result in asymmetric coating, but does not allow the deposited amount to be easily controlled. The limitations of this approach relate to the wetting properties and the viscosity of the liquid used. If the liquid (solution, melted polymer) is not very viscous, it spreads quickly around the fiber and coating is not asymmetric. By using a more viscous system, it is possible to achieve asymmetric coating, but its thickness cannot easily be controlled. For example, for a polymer which remains very viscous in the melted state at high temperatures and solidifies at low temperatures, a certain amount of polymer is drawn and rapidly congealed during cooling. The drawn amount depends on several related parameters which are difficult to control: polymer viscosity, cooling, fiber passage speed, wettability of the fiber by the polymer. In the end, the coated amount is only slightly controlled. It might be considered that passing through a polymer solution, rather than through a melted product, could solve this problem. Indeed, by dissolving the polymer a system with controllable and reproducible viscosity and wetting properties is attained. These only depend on the solvent used and not on a cooling process. When the solvent evaporates, the polymer dries onto the. By using different concentrations of polymer, layers of controlled thickness can be made. However, passing through a solution does not work in a satisfactory manner as a low-viscosity solution has a tendency to spread spontaneously and uniformly around the fiber.

SUMMARY

We provide a method of manufacturing composite fibers including two distinct layers having different compositions and physico-chemical properties and controlled, homogenous thicknesses, wherein one of the two layers includes carbon nanotubes and the composite fibers are obtained from carbon nanotube fibers and a first solution of a selected concentration of colloidal particles intended to constitute the second layer, including the following steps: placing the fibers in contact, by lateral surfaces thereof, with a surface of a second solution which is adapted to chemically cause aggregation of the colloidal particles and is completely or partially immersed in the second solution, the immersed thickness of the fibers defining the immersion area, placing the thus pre-coated fibers in contact, on the same lateral surface, with a surface of the first colloidal particle solution and immersed in it at most up to the immersion area to locally form a colloidal gel with a fixed thickness determined by the concentration of the first solution, separating the fibers covered in the first solution, and drying and/or evaporating the solvent of the first solution.

We also provide concentric fibers obtained from the method, wherein immersion in the second solution is complete.

We further provide asymmetric fibers obtained from the method, wherein immersion in the second solution is partial.

We still further provide electrodes or sensors including the concentric fibers.

We further still provide mechanical actuators including the asymmetric fibers.

BRIEF DESCRIPTION OF THE DRAWINGS

The methods and fibers will be understood better after reading the detailed description made below in reference to the drawings, wherein.

DETAILED DESCRIPTION

Figures 1, 2, 3:
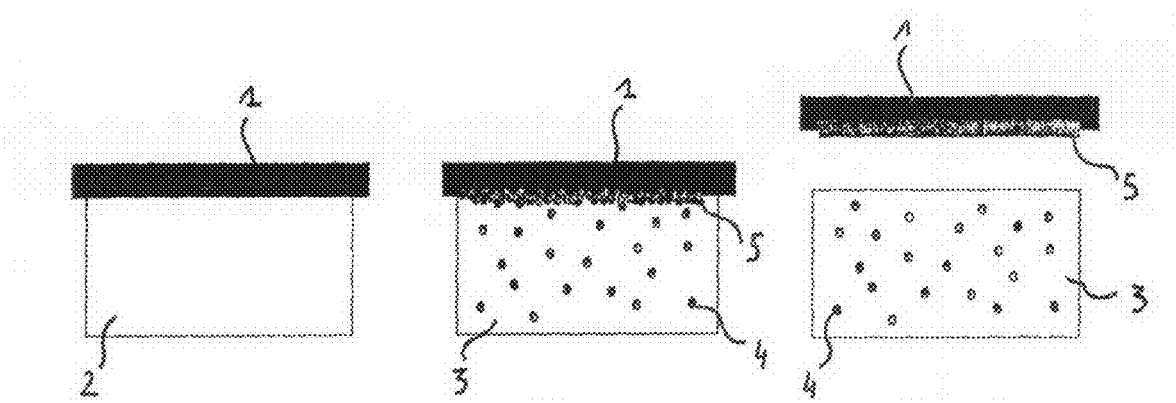
FIGS. 1, 2 and 3 show a block diagram of one aspect of the method.
Figure 4:
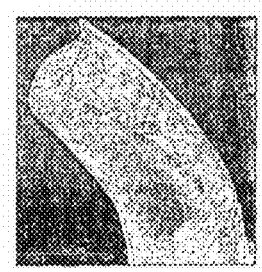
FIGS. 4, 5, 6 and 7 show examples of asymmetric fibers obtained from one aspect of the method for different colloid concentrations.
Figure 5:
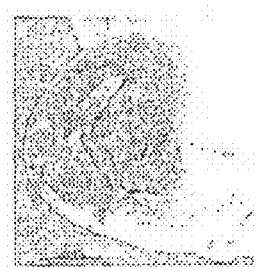
Figure 6:
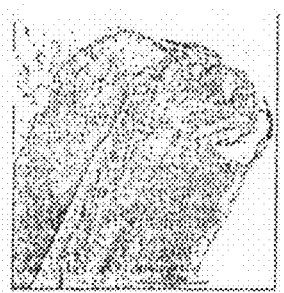
Figure 7:
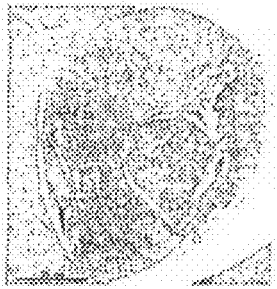

We provide a method of manufacturing composite fibers comprising two distinct layers having different physico-chemical compositions and properties and controlled and homogenous thicknesses, one of the two layers consisting of carbon nanotubes, the composite fibers being obtained from carbon nanotube fibers and a first solution of a given concentration of colloidal particles intended to constitute the second layer, which compensates for all of the afore-mentioned drawbacks.

To this effect, the composite fiber manufacturing process comprises:
the fibers are placed in contact, by their lateral surface, with the surface of a second solution which is chemically capable of causing the aggregation of the colloidal particles and is completely or partially immersed in the second solution, the immersed thickness of the fibers defining the immersion area,
the fibers, thus pre-coated, are placed in contact, on the same lateral surface, with the surface of the first colloidal particle solution and immersed in it at most up to said immersion area so as to locally form a colloidal gel with a fixed thickness determined by the concentration of said first solution,
the separation of the fibers covered in the first solution, and drying and/or evaporating the solvent of the first solution.

The given concentration of colloidal particles is preferably comprises between 0.5% and 50% by mass, inclusive.

The second solution is preferably chosen from among saline solutions, solutions enriched with micelles or non-adsorbent polymers to induce favorable depletion interactions and/or solutions in which the pH conditions destabilize the colloidal particles.

Even more preferably, the saline solutions are aluminium chloride solutions.

In particular, the colloidal particles are chosen from among polymer particles, metallic particles, semi-conducting particles, emulsion drops and/or inorganic particles.

More particularly, the polymer particles are polystyrene latex.

Even more particularly, the inorganic particles are chosen from silica, titanium oxide and/or clay.

According to a preferred aspect of the method, the immersion in said second solution is complete.

This approach also enables the production of coaxial and concentric composite fibers.

According to another aspect of the method, the immersion in the second solution is partial.

This approach, thus, allows for the production, in particular, of asymmetric fibers of the previously described bimetallic strip type.

We also provide concentric fibers obtained from the first aspect of the method as well as the asymmetric fibers obtained from the second aspect of the method.

The applications of the two types of fibers are described below.

Among these, the following can be mentioned in particular:
the application of concentric fibers for producing electrodes and/or sensors, and
the application of asymmetric fibers for producing mechanical actuators.

In the second aspect of the method, the nanotube fiber is coated on a single side with a colloidal solution. If this solution is not very viscous, the coating tends to become uniform. Furthermore, the amount of colloids drawn depends on the viscosity of the colloidal dispersion, the extraction speed and the interfacial tensions (wetting) involved. These factors can vary significantly according to the products used. The other two factors which play a predominant role in the thicknesses of the added colloids and which can be controlled in a systematic manner come into play here. On the one hand is the adhesive nature of the colloids as well as their concentration. If the physico-chemical conditions are such that there is no adhesion, it is difficult to add a large amount of colloids as they tend to be eliminated with the solvent if there is a drainage phenomenon. On the other hand, if the particles are adhesive, they remain in the structure and it is possible to add a large proportion of them. The latter will be much less sensitive to the parameters involved (viscosity, wetness, extraction speed). The colloids thus rendered adhesive from contract with the second solution remain in the structure regardless of the other conditions. This behavior provides them with a considerable advantage as it becomes possible to control the amount of colloids added solely by varying their concentration in the bath. The colloid concentration effectively remains the only relevant parameter.

In FIG. 1, a carbon nanotube 1 fiber is placed in contact, by its lateral side, with the surface of a solution 2 which is chemically capable of causing aggregation of the colloidal particles. The fiber 1 is partially immersed in the solution 2. The immersed thickness of the fiber 1 defines the immersion area.

In FIG. 2, the fiber 1, thus pre-coated, is placed in contact, by the same lateral surface, with the surface of a solution 3 of colloidal particles 4 and immersed therein at most up to the immersion area. The particles 4 aggregate and deposit on the fiber 1 to locally form a colloidal gel 5 with a fixed thickness determined by the concentration of the solution 3.

In FIG. 3, the fiber 1 covered with particles 4 is separated from the solution 3 and retains a uniform and asymmetric coating of colloidal particles.

A complementary step, not shown, of drying and/or evaporating the solvent of the solution 3 is then carried out to obtain a "dry" fiber which is ready to be used or to undergo potential post-treatments required for its use.

Examples of implementations of the method are provided below.

Example 1

Implementation of the Method with a View to Produce an Asymmetric Composite (or Heterogeneous) Fiber A carbon nanotube fiber is covered with latex particles to form a nanotube fiber covered with a polymer sheath.

The carbon nanotube fibers used in this example are obtained according to the carbon nanotube spinning method described in FR 2 805 179.

Spinning characteristics:
Pre-fiber obtained by injecting a nanotube solution into the flow of a coagulating polymer solution.
Nanotubes: synthesized by electric arc.
Nanotube solution: suspensions containing 0.5% of nanotube mass and 1.2% of sodium dodecyl sulphate (dispersant). The suspension is homogenized by ultrasound.
Coagulating polymer solution: aqueous solution of 5% by mass of PVA (molecular mass of 72 kg and hydrolysis ratio of 88%).

The pre-fiber is subsequently washed three times in baths of pure water, and then dried. It has a cylindrical cross-section.

This fiber is then partially immersed in a saline solution of $AlCl_3$ (concentration 1M). This trivalent salt causes flocculation of the colloidal particles (latex) used here.

The fiber, impregnated with a saline solution, is then also soaked in a colloidal solution of latex particles (polystyrene particles diameter 60 nm, volume proportion of the latex in suspension variable to perform coatings with different thicknesses) up to the limit of the immersion area.

The particles agglomerate on the part of the fiber impregnated with saline solution.

The fiber is then removed from the bath to be dried. Different concentrations of colloidal solutions have been tried, ranging from 0.5% to 50%.

In every case, the thickness of the layer obtained depends on the colloid concentration. The layers thus obtained are more homogenous due to the prior use of a saline solution.

The heterogeneous fibers obtained with an asymmetric structure are particularly interesting for obtaining bifunctional systems (the part rich in nanotubes having different properties to the part rich in colloids) or bimorph geometries for mechanical and electromechanical applications.

FIGS. 4, 5, 6, and 7 are scanning electron microscopy photographs of asymmetric carbon nanotube fibers covered in polystyrene deposited by an implementation of the method. Each fiber is covered by a polystyrene layer of variable thickness. The thickness of the polystyrene is controlled by the concentration of polystyrene latex particles in the solution with which the nanotube fiber is placed in contact. The specific concentration of colloidal particles varies in the following manner: 5%, 10%, 20% and 40%.

These fibers have very diverse applications. Concrete examples are given below.

Figure 8:
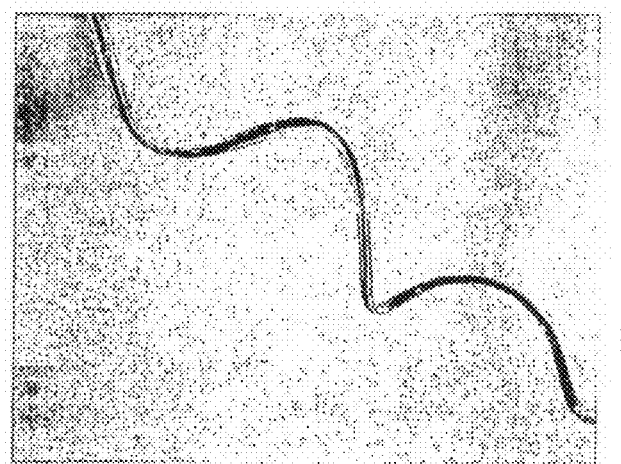
FIG. 8 shows a particular application of a fiber produced by one aspect of the method.

A simple rise in temperature leads to a sharp deformation of the fiber as the colloid-rich part and the nanotube-rich part do not have the same thermal expansion coefficients. The incorporation of such a fiber in a given solvent can also have significant mechanical effects according to whether this solvent preferentially swells one part or the other. To illustrate this effect, an asymmetric fiber containing a nanotube fiber enriched with PVA and covered by a layer of polystyrene according to one implementation of the method is produced. The nanotube/PVA part is highly hydrophilic and swells in the presence of water or moisture. The polystyrene, which is water-repellent, does not react to the presence of water. The contrasting behaviors result in a sharp deformation of the asymmetric fiber, which forms a helix in response to the extension of the nanotube/PVA part fixed as a bimetallic strip on the polystyrene part which does not extend. These deformations are reversible and give rise to shape memory effects (see FIG. 8).

This geometry is also particularly advantageous for making electromechanical actuators or sensors. The part containing the nanotubes can, for example, be stimulated by an electrical field in an electrolyte to extend or contract. When associated with a colloid-rich part having a different response to the field, or no response at all, the geometry of the bimorph results in a sharp deformation of the fiber.

Figures 9, 10, 11:
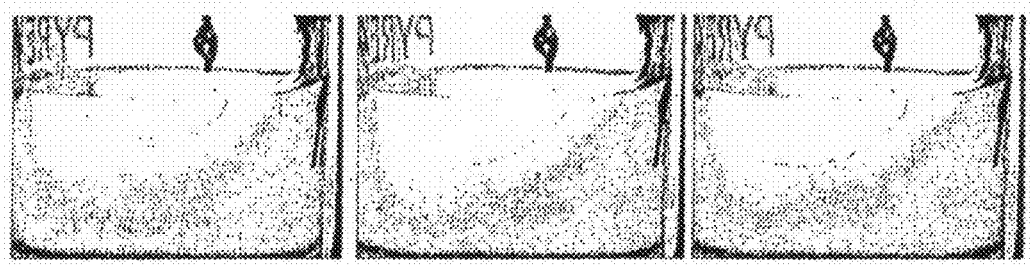
FIGS. 9, 10 and 11 show another particular application of the fibers obtained according to one aspect of the method.

This effect is illustrated in FIGS. 9 and 11.

These figures illustrate the electromechanical properties of an asymmetric carbon nanotube fiber (length 2 cm) in an electrolyte solution (NaCl 1M) when an alternating current of 1V is applied between the fiber and a counter-electrode in a solution.

The extension of the nanotube part in these conditions is of the order of 0.2% (which is around 40 microns). This slight extension is greatly amplified and curves thanks to the asymmetric geometry of the fiber. The deformation in the photos corresponds to a curvature effect caused by a movement of around a centimeter.

Example 2

Implementation of the Method to Produce a Concentric, Coaxial Composite Fiber

The method also allows for symmetric coating. By soaking the fiber in a saline solution (or any other causing the coagulation of the colloids to be deposited) and by then completely immersing the fiber in the colloidal solution, a uniform deposit is formed by aggregation of colloids on the fiber.

All the conditions are similar to those of the asymmetric coating described in the previous example, with the difference that the fibers are completely, not partially, immersed in the saline and colloidal solutions.

Mineral particles are used to illustrate the feasibility of the method with a different system, but it works just as well with latex particles as in the case of asymmetric fibers.

The colloidal solution is an aqueous dispersion of silica particles (30 nm in diameter, 20% by mass).

Figure 12:
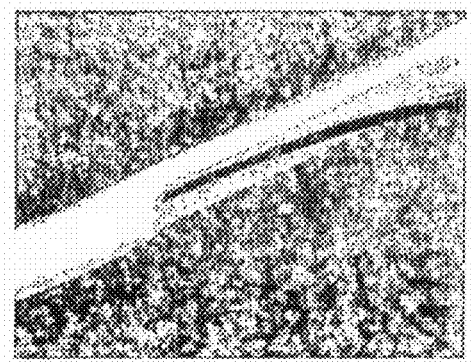
FIG. 12 is an example of a coaxial and concentric fiber obtained according to another aspect of the method.

The resulting fiber obtained is depicted in FIG. 12 which is a photograph of a carbon nanotube fiber covered in silica by aggregation and depositing colloidal silica particles on the surface. The white silica covering is purposefully open to show the nanotube fiber inside it (black interior).

The silica-covered fiber is insulating, while the nanotube fiber inside it is highly conductive of electricity (resistivity 1 ohm.cm).

The main applications of such fibers are conductive wires with an insulating sleeve as well as micro-electrodes by allowing only a controlled length at the end of the nanotube fiber to protrude.

The invention claimed is:

1. A method of manufacturing composite fibers comprising two distinct layers having different compositions and physico-chemical properties and controlled, homogeneous thicknesses, wherein one of the two layers comprises carbon nanotubes and the composite fibers are obtained from carbon nanotube fibers and a first solution of a selected concentration of colloidal particles intended to constitute the second layer, comprising the following steps:

providing the carbon nanotube fibers, providing the first solution, providing a second solution selected from the group consisting of saline solutions, solutions enriched with micelles to induce favorable depletion interactions, solutions enriched with non-adsorbent polymers to induce favorable depletion interactions, solutions in which the pH conditions destabilize the colloidal particles, and combinations thereof, contacting a lateral surface of the carbon nanotube fibers with a surface of the second solution, and immersing completely or partially the carbon nanotube fibers in the second solution, the immersed thickness of the carbon nanotube fibers defining the immersion area, contacting the same lateral surface of resulting pre-coated carbon nanotube fibers with a surface of the first colloidal particle solution and immersing the pre-coated carbon nanotube fibers in the first colloidal particle solution at most up to the immersion area, thereby causing chemical aggregation of the colloidal particles to locally form a colloidal gel with a fixed thickness determined by the concentration of the first colloidal particle solution, removing the fibers from the first solution, and drying and/or evaporating the solvent of the first solution remaining on the fibers.

2. The method according to claim 1, wherein the selected concentration of colloidal particles in the first solution is between 0.5% and 50% by mass.

3. The method according to claim 1, wherein the saline solutions are aluminium chloride solutions.

4. The method according to claim 1, wherein the colloidal particles are at least one selected from the group consisting of polymer particles, metallic particles, semi-conducting particles, emulsion drops and inorganic particles.

5. The method according to claim 4, wherein the polymer particles are polystyrene latex.

6. The method according to claim 4, wherein the inorganic particles are at least one selected from the group consisting of silica, titanium oxide and clay.

7. The method according to claim 1, wherein immersion of the carbon nanotube fibers in the second solution is complete.

8. The method according to claim 1, wherein immersion of the carbon nanotube fibers in the second solution is partial.

9. Concentric fibers obtained from a process comprising:

providing carbon nanotube fibers obtained by (i) homogeneously dispersing carbon nanotubes in a solvent, and (ii) injecting a resulting dispersion into a flow of an external coagulating polymer solution, providing a first solution of a selected concentration of colloidal particles, wherein the colloidal particles are at least one selected from the group consisting of metallic particles, semi-conducting particles, emulsion drops and inorganic particles, providing a second solution selected from the group consisting of saline solutions, solutions enriched with micelles to induce favorable depletion interactions, solutions enriched with non-adsorbent polymers to induce favorable depletion interactions, solutions in which the pH conditions destabilize the colloidal particles, and combinations thereof, contacting a lateral surface of the carbon nanotube fibers with a surface of the second solution, and completely immersing the carbon nanotube fibers in the second solution, the immersed thickness of the carbon nanotube fibers defining the immersion area, contacting the same lateral surface of resulting pre-coated carbon nanotube fibers with a surface of the first colloidal particle solution and immersing the pre-coated carbon nanotube fibers in the first colloidal particle solution at most up to the immersion area, thereby causing chemical aggregation of the colloidal particles to locally form a colloidal gel with a fixed thickness determined by the concentration of the first colloidal particle solution, removing the fibers from the first solution, and drying and/or evaporating the solvent of the first solution remaining on the fibers.

10. Asymmetric fibers obtained from a process comprising steps of:

providing carbon nanotube fibers obtained by (i) homogeneously dispersing carbon nanotubes in a solvent, and (ii) injecting a resulting dispersion into a flow of a coagulating polymer solution, providing a first solution of a selected concentration of colloidal particles, providing a second solution selected from the group consisting of saline solutions, solutions enriched with micelles to induce favorable depletion interactions, solutions enriched with non-adsorbent polymers to induce favorable depletion interactions, solutions in which the pH conditions destabilize the colloidal particles, and combinations thereof, contacting a lateral surface of the carbon nanotube fibers with a surface of the second solution, and partially immersing the carbon nanotube fibers in the second solution, the immersed thickness of the carbon nanotube fibers defining the immersion area, contacting the same lateral surface of resulting pre-coated carbon nanotube fibers with a surface of the first colloidal particle solution and immersing the pre-coated carbon nanotube fibers in the first colloidal particle solution at most up to the immersion area, thereby causing chemical aggregation of the colloidal particles to locally form a colloidal gel with a fixed thickness determined by the concentration of the first colloidal particle solution, removing the fibers from the first solution, and drying and/or evaporating the solvent of the first solution remaining on the fibers.

11. Electrodes or sensor comprising fibers according to claim 9.

12. Mechanical actuators comprising fibers according to claim 10.

13. The method of claim 1, wherein the colloidal particles are at least one selected from the group consisting of metallic particles, semi-conducting particles, emulsion drops and inorganic particles; and immersion of the carbon nanotube fibers in the second solution is complete.

14. The method according to claim 13, wherein the inorganic particles are at least one selected from the group consisting of silica, titanium oxide and clay.

* * * * *